United States Patent [19]

Miyamoto et al.

[11] 4,263,047
[45] Apr. 21, 1981

[54] COLOR DEVELOPING INK

[75] Inventors: Akio Miyamoto; Hiroharu Matsukawa, both of Fujinomiya, Japan

[73] Assignee: Fuji Photo Film Co., Ltd., Minami-ashigara, Japan

[21] Appl. No.: 74,460

[22] Filed: Sep. 11, 1979

[30] Foreign Application Priority Data

Sep. 11, 1978 [JP] Japan ................ 53/111578

[51] Int. Cl.³ .............................. C09D 11/00
[52] U.S. Cl. ...................... 106/21; 106/32; 282/27.5; 427/150; 427/152
[58] Field of Search ............... 106/21, 32; 282/27.5; 427/150, 152

[56] References Cited

U.S. PATENT DOCUMENTS

| 2,505,470 | 4/1950 | Green ............................ 428/307 |
| 2,505,489 | 4/1950 | Green ............................ 427/150 |
| 2,548,366 | 4/1951 | Green et al. .................... 428/307 |
| 2,550,471 | 4/1951 | Green et al. .................... 428/307 |
| 2,712,507 | 7/1955 | Green ............................ 428/914 |
| 2,730,456 | 1/1956 | Green et al. .................... 521/55 |
| 2,730,457 | 1/1956 | Green et al. .................... 427/150 |
| 2,800,457 | 7/1957 | Green et al. .................... 106/14.5 |
| 2,800,458 | 7/1957 | Green ............................ 106/14.5 |
| 2,939,009 | 5/1960 | Tien ............................. 521/55 |
| 3,322,557 | 5/1964 | Schwab .......................... 427/150 |
| 3,539,375 | 11/1970 | Baum ............................ 428/537 |
| 3,672,935 | 6/1972 | Miller et al. ................... 282/27.5 |
| 3,718,250 | 2/1973 | Bosworth et al. ................ 74/242.14 |
| 3,957,495 | 5/1976 | Teranishi et al. ................ 106/21 |
| 4,012,554 | 3/1977 | Miller et al. ................... 106/21 |
| 4,183,553 | 1/1980 | Petitpierre ..................... 106/21 |

FOREIGN PATENT DOCUMENTS 867797 5/1961 United Kingdom .
950443 2/1964 United Kingdom .
989264 4/1965 United Kingdom .
1091076 11/1967 United Kingdom .

Primary Examiner—Lorenzo B. Hayes
Assistant Examiner—Amelia B. Yarbrough
Attorney, Agent, or Firm—Sughrue, Rothwell, Mion, Zinn and Macpeak

[57] ABSTRACT

A color developing ink containing a phenolic resin or a metal salt of an aromatic carboxylic acid and an alcohol having from 10 to 20 carbon atoms.

12 Claims, No Drawings

COLOR DEVELOPING INK

BACKGROUND OF THE INVENTION

1. Field of the Invention

This invention relates to a color developing ink, and more particularly to a color developing ink which provides a colored image upon reaction with a substantially colorless organic compound.

2. Description of the Prior Art

Colored images have been produced for many years by catalytic reaction between a colorless organic compound as an electron donor (hereunder referred to as a color former) and a solid acid as an electron acceptor (hereunder referred to as a color developer). This technique is effectively incorporated in a pressure sensitive copying paper (disclosed, for example, in U.S. Pat. Nos. 2,505,470; 2,505,489; 2,550,471; 2,548,366; 2,712,507; 2,703,456; 2,730,457; 3,418,250; 3,672,935) and a heat sensitive recording paper (disclosed, for example in Japanese Patent Publication Nos. 4160/68, 7600/68 and 14039/70; U.S. Pat. Nos. 2,939,009; 3,322,557 and 3,539,375). A printing technique is also known for producing a colored image by supplying a color former-containing ink to a sheet coated with a color developer (disclosed in West German Patent Application (OLS) No. 1,939,962).

In a conventional color developer sheet, a color developer is coated over the entire surface of the paper sheet and it is necessary to print a desensitizing ink on the areas of the sheet where color development is not desired and this is not economical. Therefore, a color developing ink is used to print only the desired area of non developer coated sheets. But since the ink uses a low boiling organic solvent, it can only be applied to flexographic or gravure printing and cannot be used in conjunction with general relief or offset printing.

Recently, color developing inks for use in letter press printing have been proposed in Japanese Patent Application (OPI) Nos. 68307/76, 80410/76 and 94308/76, but they are more or less defective in that they do not sufficiently exhibit their color developing ability on the surface to be printed and the light fastness of the colored images produced is weak and impractical, or that they cause swelling of the rubber rollers of a printing machine. Furthermore, objects printed with a conventional developing ink cannot be stacked on a paper coated with color former containing microcapsules for an extended storage without damaging the walls of the microcapsules, impairing their function and, as a result, producing colored stain on the surface coated with the developing ink (the stain will hereunder be referred to as stack-time dependent stain).

SUMMARY OF THE INVENTION

It is therefore the primary object of this invention to provide a color developing ink which is applicable to a letter press printing or an offset printing machine, has satisfactory developing ability, affords a light-resistant colored image and is free from stack time dependent stain.

As a result of various studies, it has been found that the stated object of this invention can be achieved by a color developing ink which contains a phenolic resin or a metal salt of aromatic carboxylic acid and an alcohol having from 10 to 20 carbon atoms.

DETAILED DESCRIPTION OF THE INVENTION

Phenolic resins generally known as color developers in the industry can be used as one constituent of the color developing ink of this invention. To be more specific, phenol-aldehyde polymers (i.e., a novolak resin) and phenol-acetylene polymers can be used. Preferably these resins have a condensation degree of 2 to 8. Examples of the suitable phenolic resins include: a p-phenylphenol-formaldehyde copolymer, p-fluorophenol-formaldehyde copolymer, p-chlorophenol-formaldehyde copolymer, p-bromophenol-formaldehyde copolymer, p-iodophenol-formaldehyde polymer, p-nitrophenol-formaldehyde polymer, p-carboxyphenol-formaldehyde copolymer, o-carboxyphenol-formaldehyde copolymer, p-carboalkoxyphenol-formaldehyde copolymer, p-aroylphenol-formaldehyde copolymer, p-lower alkoxyphenyl-formaldehyde polymer, p-alkyl ($C_1$ to $C_{12}$) phenol-formaldehyde copolymer (e.g., p-methylphenol, p-ethylphenol, p-n-propylphenol, p-isopropylphenol, p-n-amylphenol, p-isoamylphenol, p-cyclohexylphenol, p-1,1-dimethyl-n-propylphenol, p-n-hexylphenol, p-isohexylphenol, p-1,1-dimethyl-n-butylphenol, p-1,2-dimethyl-n-butylphenol, p-n-heptylphenol, p-isoheptylphenol, p-5,5-dimethyl-n-amylphenol, p-1,1-dimethyl-n-amylphenol, p-n-octylphenol, p-1,1,3,3-tetramethylbutylphenol, p-isooctylphenol, p-n-nonylphenol, p-isononylphenol, p-1,1,3,3-tetramethylamylphenol, p-n-decylphenol, p-isodecylphenol, p-n-undecylphenol, p-isoundecylphenol, p-n-dodecylphenol and the like formaldehyde, a copolymer comprising formaldehyde and an isomer of said p-alkylphenol (alkyl group having 1 to 12 carbon atoms), and a copolymer comprising formaldehyde and a mixture of two or more kinds of said p-alkylphenol or isomers thereof. The same result is obtained if an m-substituent is added to the p-substituted phenol, but addition of such m-substituent is not essential for the purposes of this invention.

Examples of the suitable aromatic carboxylic acids that can be used in preparation of the color developing ink of this invention are: benzoic acid, (o, m, p) chlorobenzoic acid, (o, m, p) nitrobenzoic acid, (o, m, p) toluic acid, 4-methyl-3-nitrobenzoic acid, 2-chloro-4-nitrobenzoic acid, 2,3-dichlorobenzoic acid, 2,4-dichlorobenzoic acid, p-isopropylbenzoic acid, 2,5-dinitrobenzoic acid, p-tert-butyl benzoic acid, N-phenylanthranilic acid, 4-methyl-3-nitrobenzoic acid, salyclic acid, m-hydroxybenzoic acid, p-hydroxybenzoic acid, 3,5-dinitrosalicylic acid, 5-tert-butylsalicylic acid, 3-phenylsalicylic acid, 3-methyl-5-tert-butylsalicylic acid, 3,5-di-tert-butylsalicylic acid, 3,5-di-tert-amylsalicylic acid, 3-cyclohexylsalicylic acid, 5-cyclohexylsalicylic acid, 3-methyl-5-isoamylsalicylic acid, 5-isoamylsalicylic acid, 3,5-di-sec-butylsalicylic acid, 5-nonylsalicylic acid, 2-hydroxy-3-methylbenzoic acid, 2-hydroxy-5-tert-butylbenzoic acid, 2,4-cresotinic acid, 5,5-methylene-disalicylic acid, (o, m, p) acetaminobenzoic acid, 2,4-dihydroxybenzoic acid, 2,5-dihydroxybenzoic acid, anacardic acid, 1-naphthoic acid, 3,5-di-α,α-dimethylbenzylsalicylic acid, 3,5-di-α-methylbenzylsalicylic acid, 2-naphthoic acid, 1-hydroxy-2-naphthoic acid, 2-hydroxy-3-naphthoic acid, 2-hydroxy-1-naphthoic acid, thiosalicylic acid and 2-carboxybenzaldehyde and the like.

Aromatic carboxylic acids having a hydroxyl group at the o- or p-positions to the carboxyl group are preferred and in particular the salicyclic acid derivatives, most preferably the salicylic acid derivatives bearing substituents having 8 or more carbon atoms such as an alkyl group, an aryl group, an aralkyl group and the like at at least one of the o- and p-position to a hydroxyl group. Preferred aromatic carboxylic acids include 3,5-di-tert-butylsalicylic acid, 3,5-di-tert-amylsalicylic acid, 3,5-bis (α,α-dimethylbenzyl) salicylic acid, 3,5-bis (α-methylbenzyl) salicylic acid, 3-(α-methylbenzyl)-5-(α,α-dimethylbenzyl) salicylic acid, 3,5-di-tert-octyl-salicylic acid, and 3-cyclohexyl-5-(α,α-dimethylbenzyl) salicylic acid.

Examples of the metal that forms the metal salt of aromatic carboxylic acid that can be used in preparing the color developing ink of this invention are zinc, copper, lead, magnesium, calcium, tin, nickel and aluminum.

The alcohol having 10 to 20 carbon atoms that can be used in preparing the color developing ink of this invention can be exemplified by a normal form, iso form or a mixture of normal and iso forms of the following illustrative alcohols: decyl alcohol, undecyl alcohol, dodecyl alcohol, tridecyl alcohol, myristyl alcohol, pentadecyl alcohol, cetyl alcohol, heptadecyl alcohol, stearyl alcohol, nodadecyl alcohol, eicosyl alcohol, etc. The alcohols used in the present invention can be primary or secondary or tertiary alcohols. Among these alcohols, monohydric alcohols are preferred.

Inks prepared with alcohols having less than 10 carbon atoms are unstable, and those prepared with alcohols having more than 20 carbon atoms produce a colored image which is not satisfactorily resistant to light.

The preferred alcohol has 12 to 16 carbon atoms, and is liquid at room temperature. Inclusion of such an alcohol in a color developing ink which uses the phenolic resin or metal salt of an aromatic carboxylic acid as a color developer has the advantage of reducing the viscosity of the ink and dissolving or dispersing a higher concentration of the color developer. According to this invention, the alcohol is used in an amount which preferably ranges from 20 to 150% by weight, more preferably from 30 to 100% by weight, based on the weight of the phenolic resin or the metal salt of the aromatic carboxylic acid.

The above defined alcohol works more effectively if it is combined with a saturated aliphatic hydrocarbon which preferably has a boiling point in the range of from about 200° to 330° C. at atmospheric pressure or a compound containing the saturated aliphatic hydrocarbon. The saturated aliphatic hydrocarbon is used in an amount of from 0 to 400% by weight, preferably from 30 to 300% by weight, based on the weight of the alcohol to be used in this invention.

The color developing ink of this invention contains 10 to 80% by weight, preferably from 20 to 70% by weight, of the phenolic resin or the metal salt of the aromatic carboxylic acid.

The color developing ink of this invention may optionally contain additives generally employed in inks for letter press printing or offset printing. Examples of the additives generally employed in inks for letter press printing or offset printing are described in E. A. Apps, *Printing Ink Technology*, Chapters 2–9, Leonard Hill, London (1961). To be more specific, the color developing ink of this invention may contain a binder such as a ketone resin, polyamide resin, maleic acid resin, rosin modified phenolic resin, epoxy resin, rosin ester, petroleum resin, urethane resin, and alkyd resin. The binder is generally contained in the ink in an amount of from about 0 to 40% by weight, preferably from about 0 to 25% by weight, based on the color developing ink.

The ink may also contain an inorganic additive such as titanium dioxide, barium sulfate, calcium carbonate, talc, kaolin, acidic china clay, bentonite, organic bentonite, zinc oxide, and aluminum hydroxide. The inorganic additive is present in an amount of from 0 to 40% by weight, preferably from 0 to 30% by weight, based on the color developing ink.

A drying oil or semi-drying oil such as linseed oil, tung oil, soybean oil, fish oil or synthetic drying oil may be present in an amount of 0 to 50% by weight, preferably from 0 to 20% by weight, based on the color developing ink. A solvent such as the isopropyl naphthalenes or diphenyl methanes as disclosed in Japanese Patent Application (OPI) No. 94308/76 may be contained in the ink in an amount of from 0 to 80% by weight, preferably from 0 to 60% by weight, based on the color developing ink. A wax such as a paraffin wax, a microcrystalline wax or carnauba wax may be present in an amount of from 0 to 80% by weight, preferably from 0 to 5% by weight, based on the color developing ink; and an anti-offsetting agent such as starch or dextrin may be used in an amount of from 0 to 10% by weight, preferably from 0 to 5% by weight, based on the color developing ink.

In addition, photohardening type color developing inks can be prepared by the introduction of light-sensitive resins such as prepolymers of light-sensitive acrylic acid derivatives, polyfunctional acryl monomers and the like into the color developing ink.

The color developing ink of the present invention can be easily prepared by one skilled in the art by mixing, dissolving and optionally kneading using a three roller mill or the like the above-described components.

The coating weight of the color developing ink of this invention is in the range of from 0.1 g/m$^2$ to 2.0 g/m$^2$, preferably from 0.3 g/m$^2$ to 1.0 g/m$^2$, as calculated for the phenolic resin or the metal salt of the aromatic carboxylic acid.

While there is no limitation on the color former with which the color developing ink of this invention can be used, several examples are given below:

A triaryl methane series compounds such as 3,3-bis(p-dimethylaminophenyl)-6-dimethylaminophthalide, (i.e., Crystal Violet lactone), 3,3-bis(p-dimethylaminophenyl)-phthalide, 3-(p-dimethylaminophenyl)-3-(1,2-dimethylindole-3-yl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-bis-(2-phenylindole-3-yl)-5-dimethylaminophthalide, 3-p-dimethylaminophenyl-3-(1-methylpyrrole-2-yl)-6-dimethylaminophthalide;

diphenyl methane series compounds such as 4,4'-bis-dimethylaminobenzhydrin benzyl ether, N-halophenyl-leucoauramine, N-2,4,5-trichlorophenyl-leuco-auramine;

xanthene series compounds such as Rhodamine B-anilinolactam, Rhodamine B-p-nitroanilinolactam, Rhodamine B-p-chloroanilinolactam, 3-dimethylamino-7-methoxyfluoran, 3-diethylamino-7-methoxyfluoran, 3-diethylamino-6-methoxyfluoran, 3-diethylamino-7-chlorofluoran, 3-diethylamino-7-chloro-6-methylfluoran, 3-diethylamino-6,8-dimethylfluoran, 3-diethylamino-7-acetyl-methylaminofluoran, 3-diethylamino-7-methylaminofluoran, 3,7-diethylaminofluoran, 3-diethylamino-7-dibenzylaminofluoran, 3-diethylamino-7-methylbenzylaminofluoran, 3-diethylamino-7-phenylamino-3-methylfluoran, 3-diethylamino-7-chloroethyl-methylaminofluoran, or 3-diethylamino-7-dichloroethylaminofluoran;

thiazine series compounds such as benzoyl leucomethylene blue, or p-nitrobenzyl leuco-methylene blue;

spiro-compounds such as 3-methyl-spiro-dinaphthopyran, 3-ethyl-spiro-dinaphthopyran, 3,3'-dichlorospiro-dinaphthopyran, 3-benzyl-spiro-dinaphthopyran, 3-methyl-(3-methoxybenzo)-spiropyran, or 3-propyl-spiro-dibenzopyran. These couplers may be used independently or as a mixture.

The color formers may be dissolved in a solvent and encapsulated, or dispersed in a binder solution and then coated on a support.

As such a solvent, natural or synthetic oils can be used individually or in a combination. Specific examples of the solvents include cotton seed oil, kerosene, paraffin, naphthylene oil, alkylated biphenyl, alkylated terphenyl, chlorinated paraffin, alkylated naphthalene and the like. As examples of methods of encapsulating, mention may be made of microencapsulation using coacervation of a hydrophilic colloid sol as disclosed in U.S. Pat. Nos. 2,800,457 and 2,800,458; microencapsulation utilizing an interfacial polymerization process as disclosed in British Pat. Nos. 867,797, 950,443, 989,264 and 1,091,076; and like processes.

The performance of the color developing ink of this invention was evaluated by applying it to a sheet coated with a color former which was prepared by the following method.

PREPARATION OF COLOR FORMER COATED SHEET A

10 Parts by weight of acid-treated gelatin having an isoelectric point of 8.0 and 10 parts by weight of gum arabic was dissolved in 60 parts by weight of 40° C. water. After addition of 0.2 parts by weight of sodium alkylbenzene sulfonate as an emulsifier, 50 parts by weight of a color former oil were mixed with the solution and subjected to emulsification.

The color former oil comprised 2.5% by weight of Crystal Violet lactone and 2.0% by weight of benzoyl leuco-methylene blue dissolved in oil consisting of 4 parts by weight of diisopropyl biphenyl and one part by weight of kerosine.

When the emulsified drops had an average size of 8 microns, 100 parts by weight of 40° C. water were added to the reaction system to retard the emulsification. Under continued stirring, 210 parts by weight of 30° C. water were added, followed by addition of 20% hydrochloric acid to control the pH of the reaction system at 4.4. With further stirring, the reaction liquor was cooled to 8° C., and then 1.5 parts by weight of 20% glutaraldehyde were added to the cooled solution.

Subsequently, 30 parts by weight of 10% solution of carboxylmethyl starch were added, 25% caustic soda added dropwise to control the pH of the reaction liquor to 8.5, and the temperature of the solution was elevated to 30° C. to produce microcapsules having hardened wall films.

10 Parts of cellulose flock was dispersed into the resulting microcapsule-containing solution. The resulting mixture was applied to paper having a weight of 40 g/m$^2$ at a coverage (on a solid basis) of 6 g/m$^2$ to prepare color former sheet A.

EXAMPLE 1

A mixture comprising 60 parts of zinc 3,5-di($\alpha$-methylbenzyl)-salicylate, 20 parts of Oxokol 1213 (a mixture of C$_{12}$ and C$_{13}$ alcohols and a product of Nissan Chemical Industries) and 20 parts of paraffin oil (a fraction at 270°–295° C.) was dissolved at 100° C. to form a color developing ink. This ink was print-coated on high quality paper having a weight of 50 g/m$^2$ in a coating amount of 0.6 g/m$^2$ of zinc 3,5-di($\alpha$-methylbenzyl)salicylate using a letter press printing machine. Thus, a paper coated with color developing ink through printing was prepared.

COMPARATIVE EXAMPLE 1

A mixture of 45 parts of zinc 3,5-di($\alpha$-methylbenzyl)-salicylate and 55 parts of diisopropyl naphthalene was dissolved at 100° C. to form a color developing ink. The procedure of Example 1 was repeated to prepare a paper coated with color developing ink through printing.

EXAMPLE 2

A mixture of 40 parts of a paraphenylphenol-formaldehyde resin (CKM-5254, a product of Showa Union), 43 parts of methylphenyl xylyl methane (Hyzol SAS, a product of Nippon Petrochemicals), 15 parts of Oxokol 1215 (a mixture of C$_{12}$ and C$_{15}$ alcohols and a product of Nissan Chemical Industries) and 2 parts of microcrystalline wax (mp. 83° C.) was dissolved at 100° C. to form a color developing ink. The procedure of Example 1 was repeated to prepare a paper coated with color developing ink through printing.

COMPARATIVE EXAMPLE 2

A paper coated with color developing ink through printing was prepared by repeating the procedure of Example 2 except that 15 parts of Oxokol 1215 were replaced by an equal amount of methylphenyl xylyl methane.

PERFORMANCE TEST

Each of the papers coated with color developing ink through printing in Examples 1 and 2 and Comparative Examples 1 and 2 was overlaid with the color former coated sheet A, with the color former coating facing down. Letters were written on the sheet A with a ball point pen, and thereafter the density and light fastness of the copied image were checked. Each color developing ink coated paper was stacked on the coupler-coated sheet A and stored for a period of one month to observe the stack-time dependent stain on developed surface. The results of the performance test are indicated in Table 1 below.

TABLE 1

| Run | Copied Image | | Stack-Time dependent Stain on developed Surface |
|---|---|---|---|
| | Density | Light Fastness | |
| Example 1 | A | A | A |
| Example 2 | A | A | A |
| Com. Ex. 1 | A | B | C |
| Com. Ex. 2 | A | B | C |

A: Excellent
B: Acceptable
C: Unsuitable for practical use

While the invention has been described in detail and with reference to specific embodiments thereof, it will be apparent to one skilled in the art that various changes and modifications can be made therein without departing from the spirit and scope thereof.

What is claimed is:

1. A color developer for ink capable of being printed on paper by a letterpress printing machine or an offset printing machine consisting essentially of (i) a phenolic resin or a metal salt of an aromatic carboxylic acid and (ii) an alcohol having from 10 to 20 carbon atoms, said printed paper being characterized by satisfactory developing ability affording a light-resistant colored image when contacted with a color former and being free from stack time dependent stain.

2. The color developer for ink of claim 1, wherein said ink additionally contains (iii) a saturated aliphatic hydrocarbon having a boiling point of about 200° to 330° C. at atmospheric pressure or a saturated aliphatic hydrocarbon-containing compound.

3. The color developer for ink of claim 1, wherein said alcohol is present in an amount of 20 to 150% by weight based on the weight of the phenolic resin or the metal salt.

4. The color developer for ink of claim 2, wherein said hydrocarbon is present in an amount of about 0 to 400% by weight based on the weight of the alcohol.

5. The color developer for ink of claim 1, wherein said phenolic resin or said metal salt is present in an amount of 10 to 80% by weight.

6. The color developer for ink of claim 1, wherein said phenolic resin is a phenol-aldehyde polymer or a phenol-acetylene polymer.

7. The color developer for ink of claim 1, wherein said metal salt is a metal salt of a benzoic acid.

8. The color developer for ink of claim 1, wherein said metal salt is a metal salt of a salicylic acid.

9. The color developer for ink of claim 1, wherein said metal salt is a metal salt of an aromatic carboxylic acid having a hydroxyl group at the o- or p-position.

10. The color developer for ink of claim 9, wherein said aromatic carboxylic acid is a salicylic acid bearing a substituent having 8 or more carbon atoms at a position ortho or para to the hydroxyl group.

11. In a letter press or offset printing process using a color developer for ink, the improvement wherein said ink is the ink of claim 1.

12. A printed paper having printed on at least one surface thereof, the color developer for ink of claim 1.